US009776663B1

(12) United States Patent
Craig et al.

(10) Patent No.: US 9,776,663 B1
(45) Date of Patent: Oct. 3, 2017

(54) VEHICLE SUBFRAME ASSEMBLY

(71) Applicant: Ford Global Technologies, LLC, Dearborn, MI (US)

(72) Inventors: Ryan Craig, Harrison Township, MI (US); Christopher Stephen O'Connor, Livonia, MI (US); Akshay Kulkarni, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/084,597

(22) Filed: Mar. 30, 2016

(51) Int. Cl.
*B62D 21/15* (2006.01)
*B60K 5/10* (2006.01)
*B62D 3/00* (2006.01)

(52) U.S. Cl.
CPC ............. *B62D 21/155* (2013.01); *B60K 5/10* (2013.01); *B62D 3/00* (2013.01)

(58) Field of Classification Search
CPC ........... B62D 21/155; B62D 3/00; B60K 5/10
See application file for complete search history.

(56) References Cited

U.S. PATENT DOCUMENTS

| 5,178,230 | A | | 1/1993 | Goor | |
| 5,251,932 | A | * | 10/1993 | Ide | B60G 21/0551 180/427 |
| 5,372,216 | A | * | 12/1994 | Tsuji | B60G 99/00 180/274 |
| 5,613,709 | A | * | 3/1997 | Nakamichi | B62D 1/197 180/232 |
| 5,915,494 | A | * | 6/1999 | Matsumura | B60K 5/04 180/232 |
| 6,893,065 | B2 | | 5/2005 | Seksaria et al. | |
| 7,393,016 | B2 | | 7/2008 | Mitsui et al. | |
| 7,588,117 | B2 | * | 9/2009 | Fukuda | B60K 1/00 180/291 |
| 7,740,278 | B2 | * | 6/2010 | Kakuta | B62D 3/12 280/777 |
| 8,646,792 | B2 | | 2/2014 | Young et al. | |
| 9,045,172 | B2 | | 6/2015 | Gopal et al. | |

(Continued)

FOREIGN PATENT DOCUMENTS

CN 201090655 Y 7/2008
EP 1510444 B1 1/2006

OTHER PUBLICATIONS

Bryan et al., "Ford Edge Drivetrain Pulse Reduction", ME 450, Section 3, Winter 2008, Final Report, 84 pages.

*Primary Examiner* — Darlene P Condra
(74) *Attorney, Agent, or Firm* — Jason C. Rogers; Bejin Bieneman PLC

(57) ABSTRACT

A vehicle includes a frame, a subframe, a powertrain, a steering gear, and a bracket. The subframe is fastened to the frame at a subframe attachment point, and the subframe is movable relative to the frame along a collision path in response to a frontal collision. The powertrain is attached to the subframe. The steering gear is coupled to the subframe and disposed in the collision path between the powertrain and the subframe attachment point. The bracket is attached to the powertrain and disposed in the collision path between the powertrain and the steering gear. The bracket is positioned to wedge the steering gear between the subframe and the frame during the frontal collision to deform the subframe at the subframe attachment point.

19 Claims, 7 Drawing Sheets

(56) References Cited

U.S. PATENT DOCUMENTS

| | | | |
|---|---|---|---|
| 2007/0215397 A1* | 9/2007 | Suzuki | B60K 1/00 180/65.31 |
| 2013/0008735 A1* | 1/2013 | Hiramatsu | B60K 17/16 180/291 |
| 2013/0200653 A1* | 8/2013 | Yasui | B62D 21/11 296/187.08 |
| 2014/0252739 A1* | 9/2014 | Otani | B62D 21/155 280/124.109 |
| 2014/0326526 A1* | 11/2014 | Yasui | B62D 21/11 180/274 |
| 2014/0360798 A1 | 12/2014 | Ghislieri et al. | |
| 2015/0298741 A1* | 10/2015 | Winberg | B62D 21/11 296/187.09 |
| 2016/0236718 A1* | 8/2016 | Tatsuwaki | B62D 21/155 |

\* cited by examiner

VEHICLE SUBFRAME ASSEMBLY

BACKGROUND

A powertrain for a vehicle may be located in the front of the vehicle on a subframe attached to a frame. The powertrain may include components such as the engine and the transmission. The subframe is a discrete, separate structure from the frame that is attached to the frame and carries certain components. As an example, a unibody type vehicle architecture may include the subframe attached to the frame.

During a front collision, a vehicle traveling forward strikes an object or another vehicle. The collision may push components located in the front of the vehicle, such as components of a powertrain, backwards relative to the vehicle. During this deformation, the components stack up into each other. This "stack-up" of components may increase the severity of the deceleration pulse experience by any occupants of the vehicle, that is, the deceleration versus time over the course of a collision, by creating load paths that may transfer the force from a collision into the passenger cabin. The stack-up may also increase the risk or severity of an intrusion into the passenger cabin.

DETAILED DESCRIPTION

Figure 1:
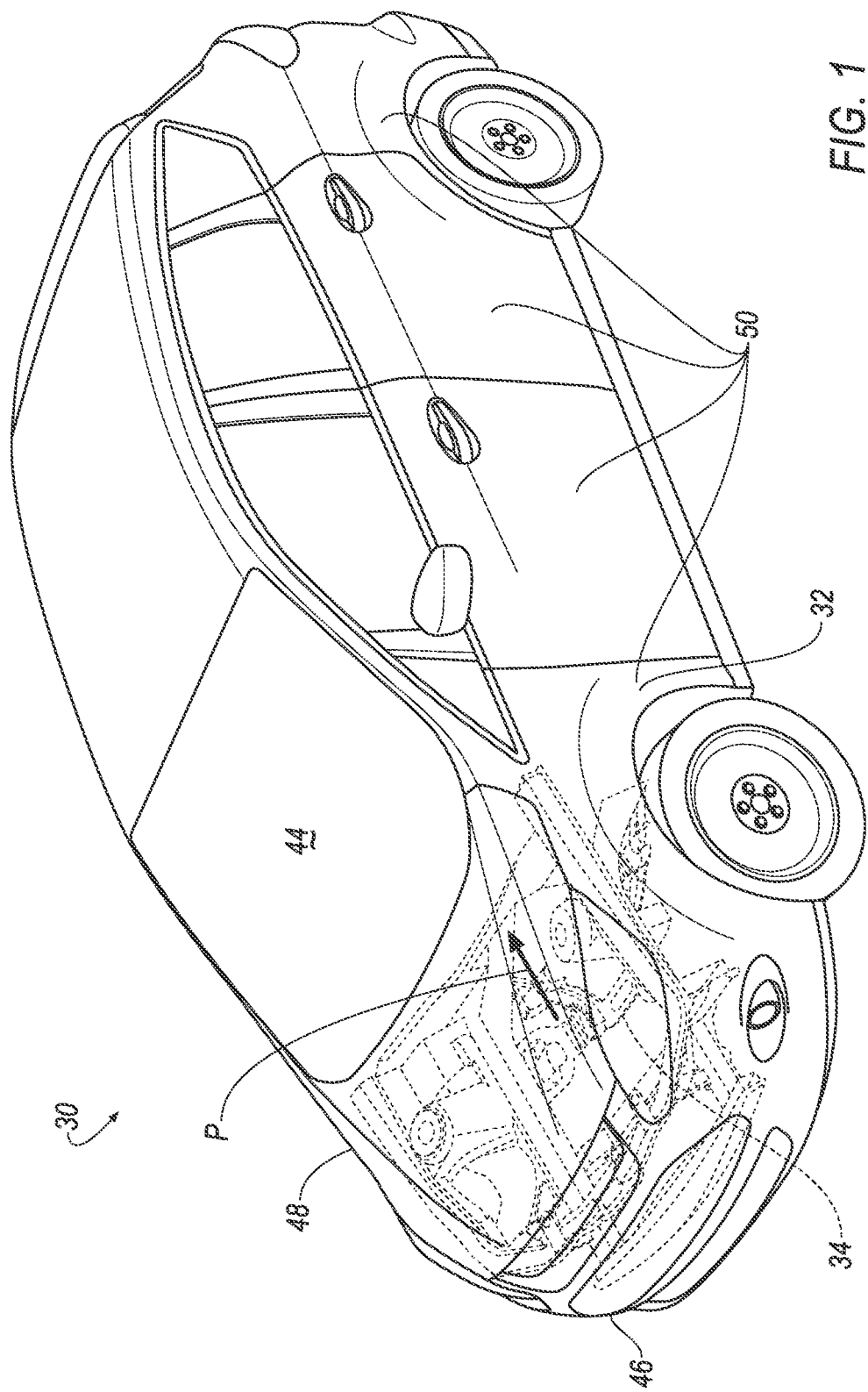
FIG. 1 is a perspective view of a vehicle including a portion of a frame, a powertrain, and a subframe in hidden lines.
Figure 2:
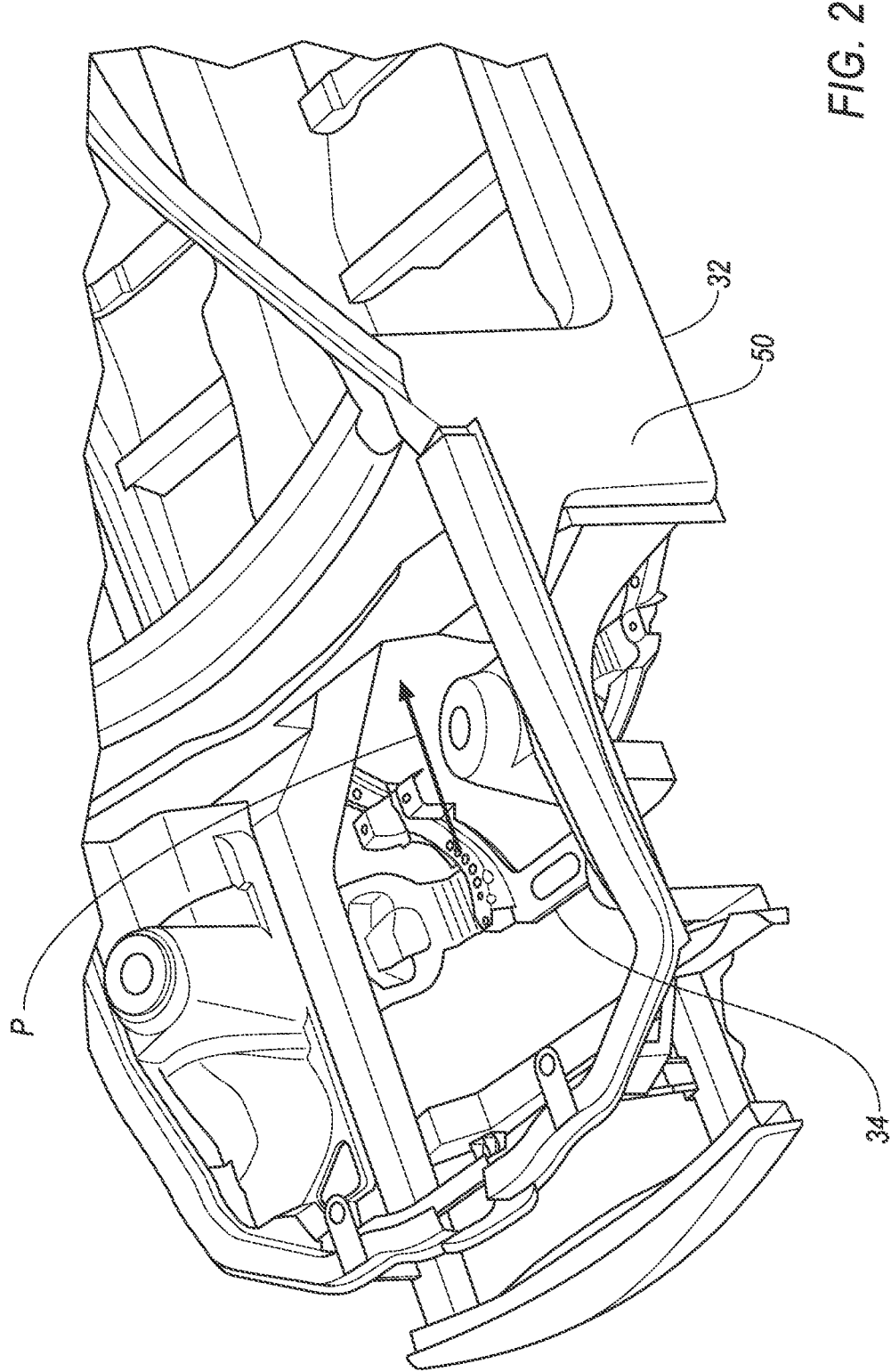
FIG. 2 is a perspective view of a frame and a subframe.

With reference to the Figures, wherein like numerals indicate like parts throughout the several views, a vehicle 30 includes a frame 32, a subframe 34, a powertrain 36, a steering gear 38, and a bracket 40. The subframe 34 is fastened to the frame 32 at a subframe attachment point 42, and the subframe 34 is movable relative to the frame 32 along a collision path P in response to a frontal collision. The powertrain 36 is attached to the subframe 34. The steering gear 38 is coupled to the subframe 34 and disposed in the collision path P between the powertrain 36 and the subframe attachment point 42. The bracket 40 is attached to the powertrain 36 and disposed in the collision path P between the powertrain 36 and the steering gear 38. The bracket 40 is positioned to wedge the steering gear 38 between the subframe 34 and the frame 32 during the frontal collision to deform the subframe 34 at the subframe attachment point 42.

The positioning of the bracket 40 may cause the subframe 34 to decouple from the frame 32 during a collision, e.g., a front collision. Decoupling may reduce a stack-up of the components of the powertrain 36 against a passenger cabin 44. Thus, the bracket 40 may reduce the severity of the deceleration pulse and may reduce the amount and risk of an intrusion into the passenger cabin 44.

With reference to FIG. 1, the vehicle 30 includes a bumper 46 disposed at the front of the vehicle 30, a hood 48 above the bumper 46, and body panels 50. The subframe 34 is fastened to the frame 32, shown in hidden lines, and the powertrain 36 is attached to the subframe 34, shown in FIGS. 3-4D. The passenger cabin 44 may hold occupants of the vehicle 30.

The frame 32 may be of a unibody construction, as shown in the Figures, in which at least some of the frame 32 is exposed and may present a class-A surface 50, i.e., a surface specifically manufactured to have a high-quality, finished aesthetic appearance free of blemishes. The frame 32 may, alternatively, be of a body-on-frame construction, or of any other suitable construction. The frame 32 may be formed of any suitable material, for example, steel, aluminum, etc.

Figure 4A:
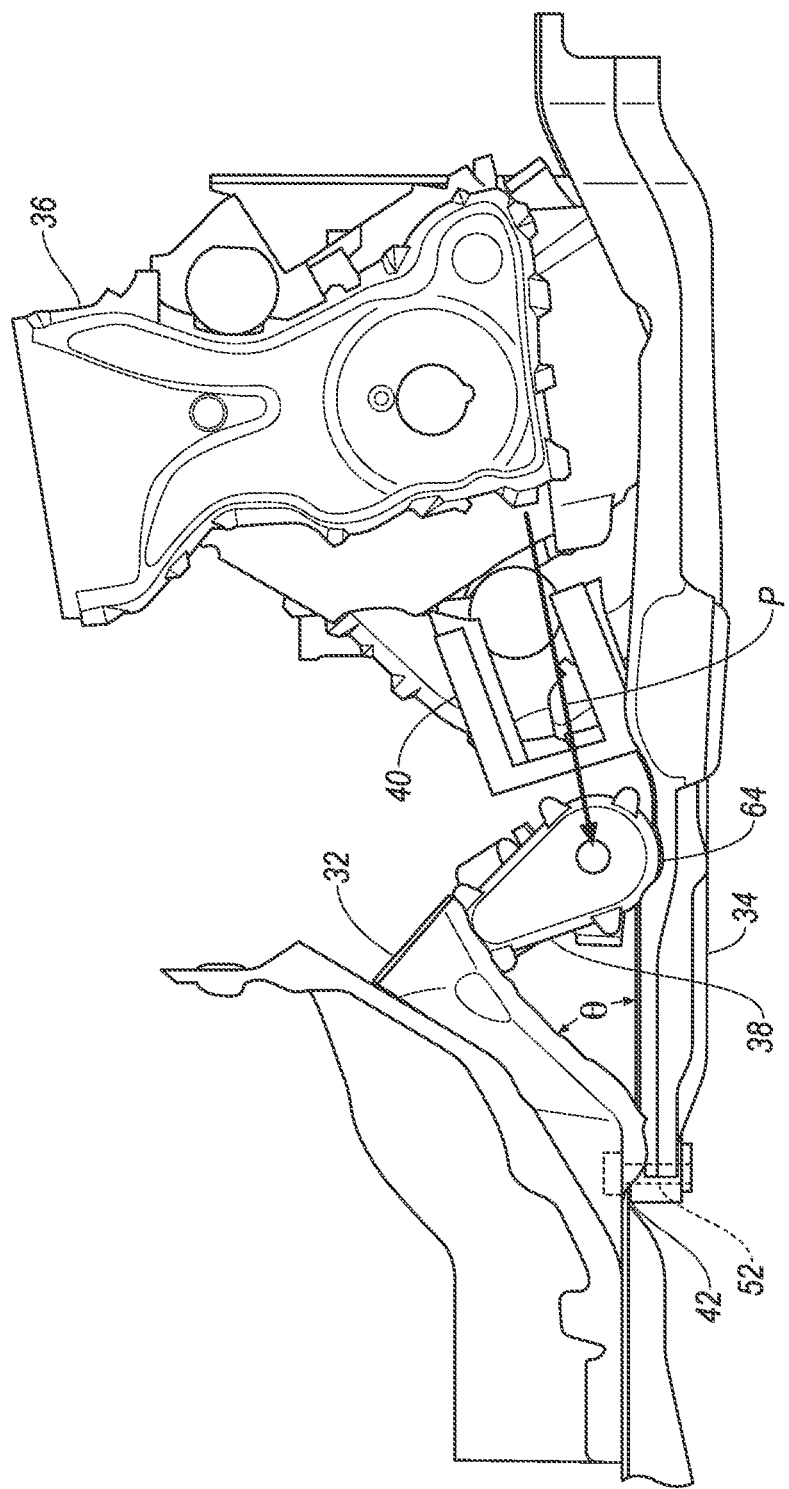
FIGS. 4A-4D are side views of the frame, subframe, and powertrain at progressive times during a frontal collision.

The subframe 34 is fastened to the frame 32 at the subframe attachment point 42. As shown in FIG. 4A, the subframe 34 is fastened to the frame 32 at an acute angle θ, that is, the angle θ between the frame 32 and the subframe 34 is less than 90°. The subframe 34 may support the powertrain 36, as well as other components coupled to the powertrain 36. The subframe 34 may be positioned beneath the hood 48. The subframe 34 may be formed of the same material as the frame 32 or a different material. The subframe 34 may be formed of any suitable material, for example, steel, aluminum, etc.

With reference to FIG. 4A, a bolt 52 (or bolts 52) may attach the subframe 34 to the frame 32 at the subframe attachment point 42. The bolt 52 may be a threaded fastener. The bolt 52 may pass through the frame 32 and the subframe 34 and thread into a nut in order to fasten the frame 32 and the subframe 34, or the bolt 52 may thread directly into the frame 32 or the subframe 34. The bolt 52 may be formed of metal such as steel or aluminum. The bolt 52 may be deformable, e.g., bendable and/or breakable, relative to the bracket 40, that is, the bolt 52 may shear or break apart under less force than required to buckle the bracket 40.

With reference to FIGS. 1 and 4A, the subframe 34 may be movable relative to the frame 32 along the collision path P in response to a frontal collision. In a frontal collision, the subframe 34 may be propelled opposite the direction of movement of the vehicle 30 relative to the frame 32.

Figure 3:
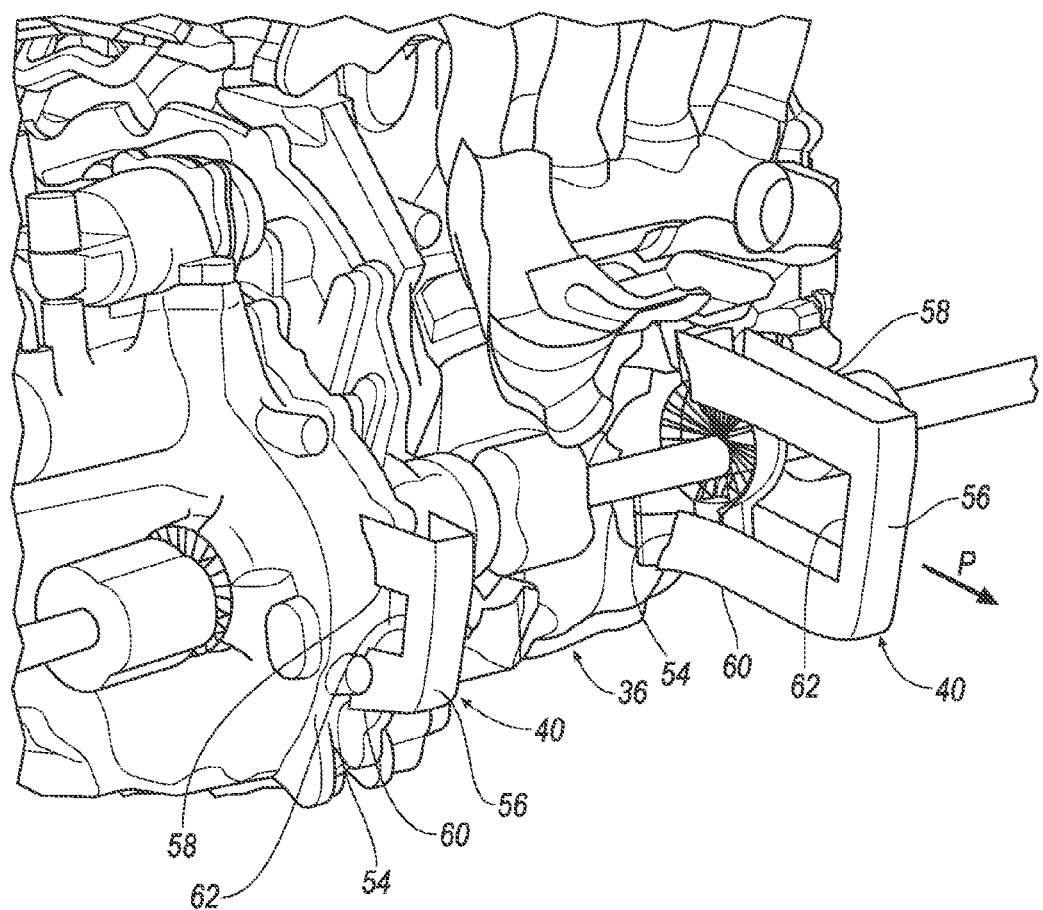
FIG. 3 is a perspective view of the powertrain including a bracket.

With reference to FIG. 3, the powertrain 36 may be attached to the subframe 34. The powertrain 36 includes the components that generate power and propel the vehicle 30. In an internal-combustion vehicle, for example, the powertrain 36 may include an engine, a transmission, driveshafts, and/or differentials, etc. In an electric vehicle, for example, the powertrain 36 may include an electric motor, batteries, a transmission, driveshafts, and/or differentials, etc. A hybrid vehicle may include elements of the powertrain 36 of an internal-combustion and an electric vehicle.

With reference to FIG. 4A, the steering gear 38 is coupled to the subframe 34 and is disposed in the collision path P between the powertrain 36 and the subframe attachment point 42. The steering gear 38 may be aligned with the subframe attachment point 42 along the collision path P. The steering gear 38 may receive input from a driver of the vehicle 30 via, for example, a steering wheel (not numbered) and transfer the input to a steering system, for example, a rack-and-pinion steering mechanism (not numbered). The steering gear 38 may be deformable, e.g., bendable and/or breakable, relative to the bracket 40, that is, the steering gear 38 may deform plastically under less stress than required for the bracket 40 to deform.

The steering gear 38 may include one or more steering gear connections 64 (generally identified in FIG. 4A) connecting the steering gear 38 to the subframe 34. The steering gear connection 64 may be, for example, threaded fasteners, welding, a combination fasteners and welding, etc. The steering gear connection 64 may be deformable relative to the bracket 40.

With reference to FIG. 3, the bracket 40 is attached to the powertrain 36 and disposed in the collision path P between the powertrain 36 and the steering gear 38. In other words, the bracket 40 and the steering gear 38 are aligned with each other such that the bracket 40 moves along collision path P and impacts the steering gear 38 when the subframe 34 releases from the frame 32 during a front impact of the vehicle 30. That is, prior to front impact, the bracket 40 is positioned in a vertical position, a cross-vehicle position, and a vehicle fore-and-aft position such that the bracket 40 moves along the collision path P to steering gear 38 during a front impact.

The bracket 40 may be attached only to the powertrain 36 and may specifically be fastened to the powertrain 36. The bracket 40 may be aligned with the subframe attachment point 42 along the collision path P. The bracket 40 may be positioned to wedge the steering gear 38 between the subframe 34 and the frame 32, i.e., into the acute angle θ, during the frontal collision and to deform the subframe 34 at the subframe attachment point 42.

The bracket 40 is elongated along the collision path P. The bracket 40 includes a base portion 54 fastened to the powertrain 36 and a contacting surface 56 spaced from the base portion 54 and positioned to contact the steering gear 38 during a frontal collision, i.e., aligned with the subframe attachment point 42 along the collision path P. The base portion 54 may include a first leg 58 and a second leg 60 spaced from each other and extending from the powertrain 36, and a cross-member 62 spaced from the powertrain 36 extending from the first leg 58 to the second leg 60. The first and second legs 58, 60 may extend from the powertrain 36 to the cross-member 62.

The cross-member 62 may include the contacting surface 56. The contacting surface 56 may be sized and shaped to deform and/or break the steering gear 38 and/or the steering gear connection 64 when the contacting surface 56 contacts the steering gear 38. The contacting surface 56 may be, for example, positioned at an angle configured to wedge the steering gear 38 against the frame 32. The contacting surface 56 may be elongated along steering gear 38 to maximize surface contact between the contacting surface 56 and the steering gear 38.

The bracket 40 is configured to move the steering gear 38 toward the frame 32 and to wedge the steering gear 38 against the frame 32 to apply tension and/or shear force on the bolts 52 to break the bolts 52 during a front impact. In other words, the bracket 40 may be sized, shaped, and/or formed of a suitable material to wedge the steering gear 38 against the frame 32 to break the bolts 52 in tension and/or shear. For example, the steering gear 38 and/or the steering gear connections 64 may be deformable, i.e., bendable and/or breakable, relative to the bracket 40. The bracket 40 may be sized, shaped, and or formed of a suitable material such that the steering gear 38 and/or the steering gear connections 64 are deformable relative to the bracket 40. As one example, as shown in the Figures, the steering gear connections 64 are deformable relative to the bracket 40 due to the material type and the size of the steering gear connections 64 in relation to a wall thickness of the legs 58, 60 and cross member 62, an angle of the contacting surface 56, and the material type of the bracket 40.

The bracket 40 may be formed of metal; specifically, the bracket 40 may be formed of stamped steel or cast aluminum.

Figure 4B:
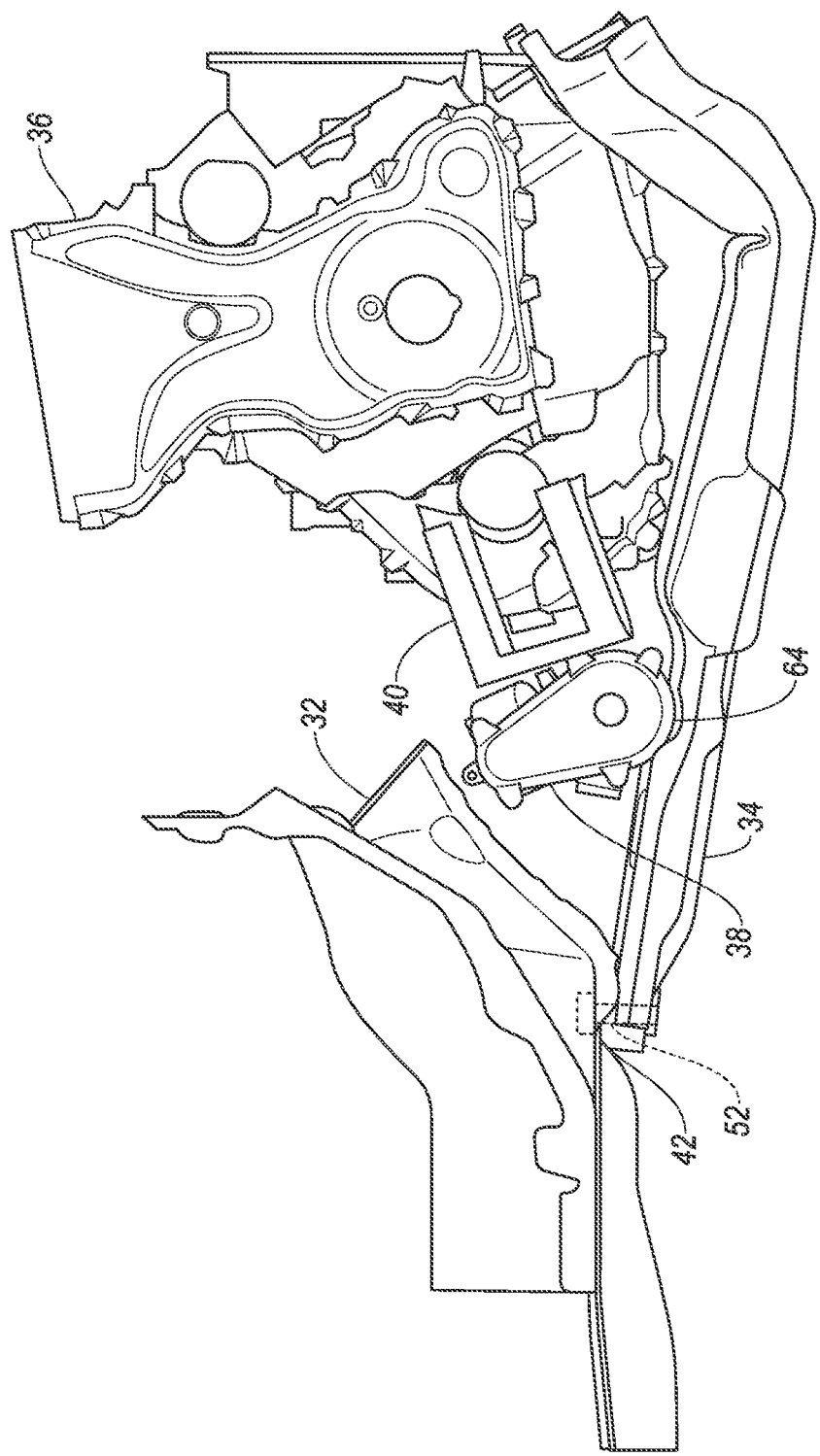
Figure 4C:
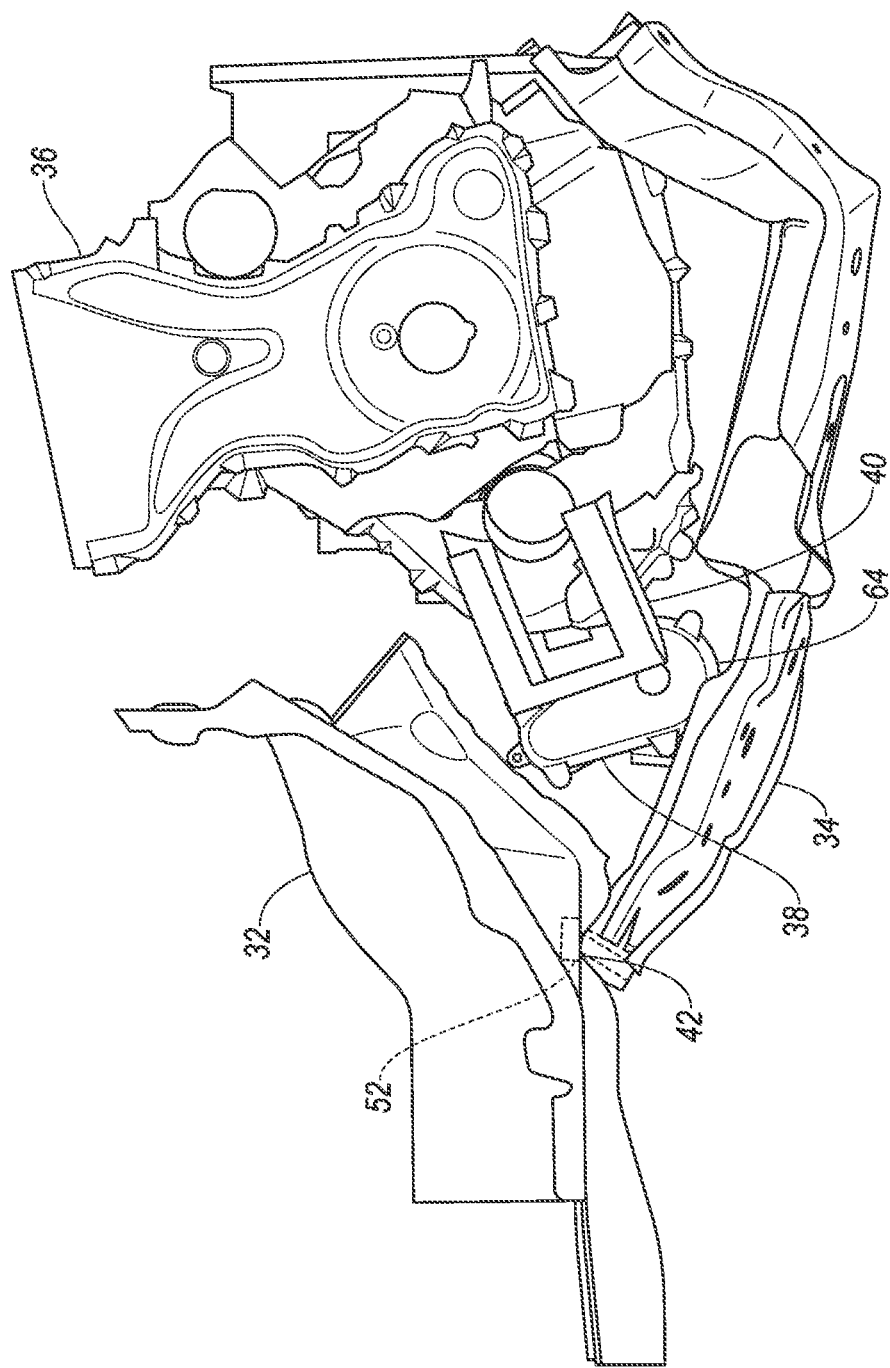
Figure 4D:
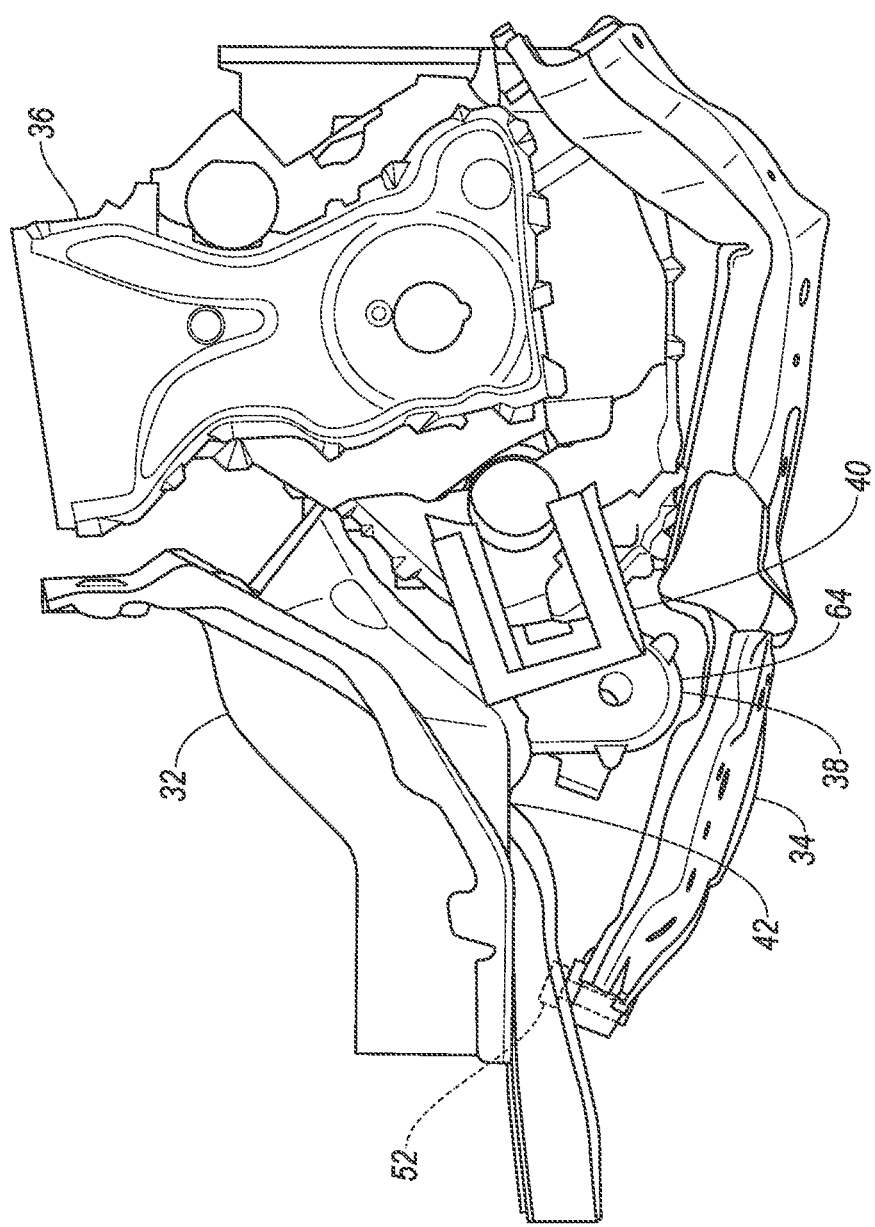

With reference to FIGS. 4A-4D, in the event of a frontal collision, an impactor, e.g., another vehicle, may first impact the bumper 46. Force from the impact may then be transferred to the subframe 34 and to the powertrain 36. The powertrain 36 may be pushed backwards relative to the vehicle 30 and relative to the frame 32 along the collision path P, as shown in FIG. 4B. The bracket 40, which is attached to the powertrain 36, may be pushed into the steering gear 38. As the impact continues, the bracket 40 may push the steering gear 38 into the acute angle θ between the subframe 34 and the frame 32, as shown in FIG. 4C. The wedging of the steering gear 38 and the bracket 40 pushes apart the subframe 34 and the frame 32. Finally, the bolts 52 fastening the subframe 34 to the frame 32 may break, detaching the subframe 34 from the frame 32, as shown in FIG. 4D. The powertrain 36, bracket 40, and steering gear 38 may then travel below the frame 32 rather than transmitting force directly backwards into the frame 32, thus reducing intrusion into the passenger cabin 44, which may reduce the likelihood of injury to any occupants.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a frame;
   a subframe fastened to the frame at a subframe attachment point, the subframe being movable relative to the frame along a collision path in response to a frontal collision;
   a powertrain attached to the subframe;
   a steering gear coupled to the subframe and disposed in the collision path between the powertrain and the subframe attachment point; and
   a bracket attached to the powertrain, extending toward the steering gear, and disposed in the collision path between the powertrain and the steering gear, the bracket being positioned to wedge the steering gear between the subframe and the frame during the frontal collision to deform the subframe at the subframe attachment point.

2. The vehicle of claim 1, wherein the subframe is fastened to the frame at an acute angle and wherein the bracket is positioned to wedge the steering gear into the acute angle during the frontal collision.

3. The vehicle of claim 2, wherein the bracket and the steering gear are aligned with the subframe attachment point along the collision path.

4. The vehicle of claim 3, wherein the steering gear is deformable relative to the bracket.

5. The vehicle of claim 1, wherein the bracket includes a base portion fastened to the powertrain and a contacting surface spaced from the base portion and positioned to contact the steering gear during the frontal collision.

6. The vehicle of claim 5, wherein the base portion includes a first leg and a second leg spaced from each other and extending from the powertrain, and a cross member spaced from the powertrain extending from the first leg to the second leg, the first and second legs extending from the powertrain to the cross member, the cross member including the contacting surface.

7. The vehicle of claim 6, wherein the contacting surface and the steering gear are aligned with the subframe attachment point along the collision path.

8. The vehicle of claim 7, wherein the bracket is attached only to the powertrain.

9. The vehicle of claim 7, wherein the bracket is elongated along the collision path.

10. The vehicle of claim 6, wherein the bracket is formed of metal.

11. The vehicle of claim 6, further comprising a bolt attaching the subframe to the frame at the subframe attachment point, wherein the bolt is deformable relative to the bracket.

12. The vehicle of claim 1, further comprising a bolt attaching the subframe to the frame at the subframe attachment point, wherein the bolt is deformable relative to the bracket.

13. The vehicle of claim 1, wherein the bracket and the steering gear are aligned with the subframe attachment point along the collision path.

14. The vehicle of claim 1, wherein the bracket is elongated along the collision path.

15. The vehicle of claim 1, wherein the bracket is fastened to the powertrain.

16. The vehicle of claim 1, wherein the bracket is attached only to the powertrain.

17. The vehicle of claim 1, wherein the bracket is formed of metal.

18. The vehicle of claim 1, wherein the bracket is formed of stamped steel.

19. The vehicle of claim 1, wherein the bracket is formed of cast aluminum.

* * * * *